United States Patent
Mattayan et al.

(10) Patent No.: US 10,941,223 B2
(45) Date of Patent: *Mar. 9, 2021

(54) MULTIMODAL POLYETHYLENE COMPOSITION AND A FILM COMPRISING THE SAME

(71) Applicants: Thai Polyethylene Co., Ltd., Bangkok (TH); SCG Chemicals Co., Ltd., Bangkok (TH)

(72) Inventors: Arunsri Mattayan, Bangkok (TH); Saranya Traisilanun, Bangkok (TH); Watcharee Cheevasrirungruang, Bangkok (TH); Warachad Klomkamol, Bangkok (TH)

(73) Assignees: Thai Polyethylene Co., Ltd., Bangkok (TH); SCG Chemicals Co., Ltd., Bangkok (TH)

( * ) Notice: Subject to any disclaimer, the term of this patent is extended or adjusted under 35 U.S.C. 154(b) by 24 days.

This patent is subject to a terminal disclaimer.

(21) Appl. No.: 16/332,015

(22) PCT Filed: Sep. 8, 2017

(86) PCT No.: PCT/EP2017/072571
§ 371 (c)(1),
(2) Date: Mar. 11, 2019

(87) PCT Pub. No.: WO2018/046656
PCT Pub. Date: Mar. 15, 2018

(65) Prior Publication Data
US 2020/0056021 A1 Feb. 20, 2020

(30) Foreign Application Priority Data
Sep. 12, 2016 (EP) .................. 16188329

(51) Int. Cl.
| | |
|---|---|
| *C08F 10/02* | (2006.01) |
| *B01D 19/00* | (2006.01) |
| *B01J 19/24* | (2006.01) |
| *C08J 5/18* | (2006.01) |
| *C08L 23/06* | (2006.01) |

(52) U.S. Cl.
CPC .......... *C08F 10/02* (2013.01); *B01D 19/0005* (2013.01); *B01J 19/245* (2013.01); *C08J 5/18* (2013.01); *C08L 23/06* (2013.01); *B01J 2219/0004* (2013.01); *C08F 2500/01* (2013.01); *C08F 2500/05* (2013.01); *C08F 2500/12* (2013.01); *C08F 2500/16* (2013.01); *C08J 2323/06* (2013.01); *C08J 2423/06* (2013.01); *C08L 2203/16* (2013.01); *C08L 2205/025* (2013.01); *C08L 2205/03* (2013.01); *C08L 2207/068* (2013.01)

(58) Field of Classification Search
CPC ........ C08F 2/01; C08F 110/06; C08F 210/16; C08F 2/001; C08F 2500/01; C08F 2500/05; C08F 2500/12; C08F 2500/17; C08F 2500/02; C08L 23/04; C08L 23/06; C08L 23/0815; C08L 2297/068; C08L 2295/025; B01D 19/0068; C08J 5/18; C08J 2423/08;
(Continued)

(56) References Cited

U.S. PATENT DOCUMENTS

| | | |
|---|---|---|
| 6,291,601 B1 | 9/2001 | Debras |
| 6,713,561 B1 | 3/2004 | Berthold et al. |

(Continued)

FOREIGN PATENT DOCUMENTS

| | | |
|---|---|---|
| EP | 1041113 A1 | 10/2000 |
| EP | 1201713 A1 | 5/2002 |

(Continued)

OTHER PUBLICATIONS

Nov. 21, 2017—International Search Report and Written Opinion—Appl. No. PCT/EP2017/072571.

*Primary Examiner* — Nathan M Nutter
(74) *Attorney, Agent, or Firm* — Banner & Witcoff, Ltd.

(57) ABSTRACT

The present invention relates to a multimodal polyethylene composition comprising: (A) 40 to 65 parts by weight, preferably 43 to 52 parts by weight, most preferred 44 to 50 parts by weight, of the low molecular weight polyethylene, the low molecular weight polyethylene having a weight average molecular weight (Mw) of 20,000 to 90,000 g/mol and having a MFRa from 500 to 1.000 g/10 min according to ASTM D 1238; (B) 8 to 20 parts by weight, preferably 10 to 18 parts by weight, most preferred 10 to 15 parts by weight, of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and (C) 30 to 50 parts by weight, preferably 37 to 47 parts by weight, most preferred 39 to 45 parts by weight, of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol, wherein the density of the first high molecular weight polyethylene or the first ultra high molecular weight polyethylene and the second high molecular weight polyethylene or the second ultra high molecular weight polyethylene are in the range from 0.920 to 0.950 g/cm3, and wherein the molecular weight distribution of the multimodal polyethylene composition is from 20 to 28, preferably from 24 to 28, measured by gel permeation chromatography, and a film comprising the multimodal polyethylene composition and the use thereof.

20 Claims, No Drawings

(58) Field of Classification Search
CPC . C08J 2423/06; B01J 8/008; B01J 2219/0004
See application file for complete search history.

(56) References Cited

U.S. PATENT DOCUMENTS

| | | | |
|---|---|---|---|
| 6,716,936 | B1 | 4/2004 | McGrath et al. |
| 8,759,448 | B2 | 6/2014 | Buryak et al. |
| 8,802,768 | B2 | 8/2014 | Dotsch et al. |
| 2003/0191251 | A1 | 10/2003 | McGrath |
| 2004/0204542 | A1 | 10/2004 | Mattioli et al. |
| 2006/0074194 | A1 | 4/2006 | Berthold et al. |
| 2009/0105422 | A1 | 4/2009 | Berthold et al. |
| 2009/0163679 | A1 | 6/2009 | Do Nascimento et al. |
| 2009/0304966 | A1 | 12/2009 | Mehta et al. |
| 2010/0010163 | A1 | 1/2010 | Berthold et al. |
| 2010/0016526 | A1 | 1/2010 | Etherton et al. |
| 2010/0035008 | A1 | 2/2010 | Backman |
| 2010/0092709 | A1 | 4/2010 | Joseph |
| 2010/0152383 | A1 | 6/2010 | Jiang et al. |
| 2010/0301054 | A1 | 12/2010 | Berthold et al. |
| 2014/0030460 | A1 | 1/2014 | Monoi et al. |
| 2015/0051364 | A1 | 2/2015 | Vahteri et al. |
| 2019/0330390 | A1* | 10/2019 | Mattayan et al. ........ C08F 2/18 |
| 2020/0056022 | A1* | 2/2020 | Mattayan et al. .... C08F 210/16 |
| 2020/0056023 | A1* | 2/2020 | Suchao-In et al. ...... B01J 8/008 |
| 2020/0079938 | A1* | 3/2020 | Traisilanun et al. .... B01J 8/008 |

FOREIGN PATENT DOCUMENTS

| | | |
|---|---|---|
| EP | 1460105 A1 | 9/2004 |
| EP | 1417260 B1 | 8/2005 |
| EP | 1578862 B1 | 9/2005 |
| EP | 1655334 A1 | 5/2006 |
| EP | 1576047 B1 | 7/2006 |
| EP | 1576049 B1 | 7/2006 |
| EP | 2017302 A1 | 1/2009 |
| EP | 2130863 A1 | 12/2009 |
| EP | 2354184 A1 | 8/2011 |
| EP | 2407506 A1 | 1/2012 |
| EP | 2365995 B1 | 12/2012 |
| EP | 2743305 A1 | 6/2014 |
| EP | 2668231 B1 | 10/2014 |
| EP | 2907843 A1 | 8/2015 |
| HU | 0800771 A2 | 10/2010 |
| JP | 2012-067914 A | 4/2012 |
| WO | 9618677 A1 | 6/1996 |
| WO | 2004056921 A1 | 7/2004 |
| WO | 2006092377 A1 | 9/2006 |
| WO | 2006092378 A1 | 9/2006 |
| WO | 2006092379 A1 | 9/2006 |
| WO | 2007003530 A1 | 1/2007 |
| WO | 2007042216 A1 | 4/2007 |
| WO | 2007045415 A1 | 4/2007 |
| WO | 2008006487 A1 | 1/2008 |
| WO | 2008049551 A1 | 5/2008 |
| WO | 2008131817 A1 | 11/2008 |
| WO | 2009003627 A1 | 1/2009 |
| WO | 2009077142 A1 | 6/2009 |
| WO | 2009147022 A1 | 12/2009 |
| WO | 2010025342 A2 | 3/2010 |
| WO | 2012069400 A1 | 5/2012 |
| WO | 2013101767 A2 | 7/2013 |
| WO | 2013113797 A1 | 8/2013 |
| WO | 2013144324 A1 | 10/2013 |
| WO | 2013144328 A1 | 10/2013 |
| WO | 2014091501 A1 | 6/2014 |
| WO | 2015121161 A1 | 8/2015 |

* cited by examiner

MULTIMODAL POLYETHYLENE COMPOSITION AND A FILM COMPRISING THE SAME

CROSS-REFERENCE TO RELATED APPLICATIONS

This application is a U.S. National Stage application under 35 U.S.C. § 371 of International Application PCT/EP2017/072571 (published as WO 2018/046656 A1), filed Sep. 8, 2017, which claims the benefit of priority to Application EP 16188329.3, filed Sep. 12, 2016. Benefit of the filing date of each of these prior applications is hereby claimed. Each of these prior applications is hereby incorporated by reference in its entirety.

The present invention relates to Multimodal polyethylene composition for producing film.

The demand of polyethylene resins is increasingly being used in a variety of applications. As required high performance of polyethylene for a relatively new plastic. In order for balancing processability and physical properties of ethylene copolymers, the development in multimodal composition has been investigated.

A variety of films, which may be applied as the single layer or to the core or the surface of the multi-layer films, are known in the art. Likewise, a variety of polymer compositions, in particular polyethylene compositions, for producing such films are described.

WO 2013/144324 A1 discloses a polymer composition comprising a homopolymer, a first copolymer and a second copolymer of specific MFR5, density and molecular weight distribution. The polymer composition is prepared in a process involving a slurry loop reactor and two gas phase reactors.

WO 2006/092378 A1 discloses a film prepared from a polymer composition having a specific MFR5 and density and comprising three constituents, namely a homopolymer and two different copolymers.

US 2015/0051364 A1 is related to a multimodal polyethylene copolymer comprising at least three components and having a specific density and MFR21. At least one of the three components is a copolymer.

US 2010/0016526 A1 is related to a thin film which may be produced from bimodal HDPE polymer having specific density. The composition is prepared by a two stage cascade polymerization with series using a mixed catalyst system.

However, in light of the above prior art, there is still a need to provide multimodal polyethylene compositions for preparing films and films prepared by using multimodal polyethylene compositions overcoming drawbacks of the prior art, in particular high density polyethylene compositions for blown film with improved properties regarding high output, good bubble stability, high mechanical strength and high toughness at film thicknesses from 4 to 40 micron or, preferably, less.

Therefore, it is the further object of the present invention to provide multimodal polyethylene compositions for preparing films and films prepared this way overcoming drawbacks of the prior art, in particular overcoming the drawbacks mentioned above.

A multimodal polyethylene composition comprising;

(A) 40 to 65 parts by weight, preferably 43 to 52 parts by weight, most preferred 44 to 50 parts by weight, of the low molecular weight polyethylene, the low molecular weight polyethylene having a weight average molecular weight (Mw) of 20,000 to 90,000 g/mol and having a $MI_2$ from 500 to 1,000 g/10 min according to ASTM D 1238;

(B) 8 to 20 parts by weight, preferably 10 to 18 parts by weight, most preferred 10 to 15 parts by weight, of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and (C) 30 to 50 parts by weight, preferably 37 to 47 parts by weight, most preferred 39 to 45 parts by weight, of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol, wherein the density of the first high molecular weight polyethylene or the first ultra high molecular weight polyethylene and the second high molecular weight polyethylene or the second ultra high molecular weight polyethylene are in the range from 0.920 to 0.950 g/cm3, and wherein the molecular weight distribution of the multimodal polyethylene composition is from 20 to 28, preferably from 23 to 28, preferably from 24 to 26, more preferably 25 to 26, measured by gel permeation chromatography.

In a preferred embodiment, the $MI_2$ is from 500 to 1000 g/10 min, preferably from 600 to 800 g/10 min.

In a preferred embodiment, the multimodal polyethylene composition has a weight average molecular weight from 150,000 to 400,000 g/mol, preferably from 200,000 to 350,000 g/mol, measured by Gel Permeation Chromatography.

Furthermore, it is preferred, that the multimodal polyethylene composition has a number average molecular weight from 5,000 to 15,000 g/mol, preferably from 7,000 to 12,000 g/mol, measured by Gel Permeation Chromatography.

Preferably, the multimodal polyethylene composition has a Z average molecular weight from 1,000,000 to 3,000,000 g/mol, preferably from 1,000,000 to 2,500,000 g/mol, measured by Gel Permeation Chromatography.

Preferably, the multimodal polyethylene composition has a density from 0.950 to 0.962 g/cm3, preferably from 0.953 to 0.959 g/cm3, according to ASTM D 1505 and/or $MI_2$ from 0.03 to 0.15 g/10 min preferably from 0.03 to 0.12 g/10 min.

Finally, the object is achieved by a film comprising the inventive multimodal polyethylene composition, wherein the film has a thickness of 4 to 40 µm, preferably 4 to 30 µm, and most preferably 4 to 20 µm.

In preferred embodiments "parts by weight" is "percent by weight".

Regarding the inventive film, it is preferred that the film substantially comprises the inventive multimodal polyethylene composition, which means that the film does comprise further constituents only in amounts which do not affect the film properties regarding output, bubble stability, mechanical strength, toughness and the like. Most preferred the film is consisting of the inventive multimodal polyethylene composition. In addition, it was found that by using the inventive multimodal polyethylene composition a blown film can be prepared with high output, good bubble stability, high mechanical strength and high toughness which is superior over the prior arts, in particular at a film thickness from 5 to 12 micron.

The object is further achieved by, a process for producing a multimodal polyethylene composition comprising;

(a) polymerizing ethylene in an inert hydrocarbon medium in a first reactor in the presence of a catalyst system, selected from Ziegler-Natta catalyst or metallocene, and hydrogen in an amount of 0.1-95% by mol with respect to the total gas present in the vapor phase in the first reactor to obtain a low molecular weight polyethylene or medium molecular weight polyethylene;

(b) removing in a hydrogen removal unit 98.0 to 99.8% by weight of the hydrogen comprised in a slurry mixture obtained from the first reactor at a pressure in the range of 103-145 kPa (abs) and transferring the obtained residual mixture to the second reactor;

(c) polymerizing ethylene and optionally $C_4$ to $C_{12}$ α-olefin comonomer in a second reactor in the presence of a catalyst system, selected from Ziegler-Natta catalyst or metallocene, and in the presence of hydrogen in an amount obtained in step (b) to obtain a first high molecular weight polyethylene or a first ultra high molecular weight polyethylene in the form of a homopolymer or a copolymer and transferring a resultant mixture to the third reactor; and (d) polymerizing ethylene, and optionally $C_4$ to $C_{12}$ α-olefin comonomer in a third reactor in the presence of a catalyst system, selected from Ziegler-Natta catalyst or metallocene, and hydrogen, wherein the amount of hydrogen in the third reactor is in a range of 0.1-70% by mol, preferably 0.1-60% by mol with respect to the total gas present in the vapor phase in the third reactor or optionally substantial absence of hydrogen to obtain a second high molecular weight polyethylene or a second ultra high molecular weight polyethylene in the form of a homopolymer or copolymer.

Preferably, the removing in the hydrogen removal unit is removing of 98.0-99.8% by weight of the hydrogen, more preferable 98.0-99.5% by weight, and most preferred 98.0 to 99.1% by weight.

The catalyst for use in the process is selected from a Ziegler-Natta catalyst, a single site catalyst including metallocene-bases catalyst and non-metallocene-bases catalyst or chromium based might be used, preferably conventional Ziegler-Natta catalyst or single site catalyst. The catalyst is typically used together with cocatalysts which are well known in the art.

Innert hydrocarbon is preferably aliphatic hydrocarbon including hexane, isohexane, heptane, isobutane. Preferably, hexane (most preferred n-hexane) is used. Coordination catalyst, ethylene, hydrogen and optionally α-olefin comonomer are polymerized in the first reactor. The entire product obtained from the first reactor is then transferred to the hydrogen removal unit to remove 98.0 to 99.8% by weight of hydrogen, unreacted gas and some volatiles before being fed to the second reactor to continue the polymerization. The polyethylene obtained from the second reactor is a bimodal polyethylene which is the combination of the product obtained from the first reactor and that of the second reactor. This bimodal polyethylene is then fed to the third reactor to continue the polymerization. The final multimodal (trimodal) polyethylene obtained from the third reactor is the mixture of the polymers from the first, the second and the third reactor.

The polymerization in the first, the second and the third reactor is conducted under different process conditions. These can be the variation and concentration of ethylene and hydrogen in the vapor phase, temperature or amount of comonomer being fed to each reactor. Appropriate conditions for obtaining a respective homo- or copolymer of desired properties, in particularly of desired molecular weight, are well known in the art. The person skilled in the art is enabled on basis of his general knowledge to choose the respective conditions on this basis. As a result, the polyethylene obtained in each reactor has a different molecular weight. Appropriate conditions for obtaining a respective homo- or copolymer of desired properties, in particularly of desired molecular weight, are well known in the art. Preferably, low molecular weight polyethylene is produced in the first reactor, while ultra high and/or high molecular weight polyethylene are produced in the second and third reactor, respectively.

The term first reactor refers to the stage where the low molecular weight polyethylene (LMW) or the medium molecular weight polyethylene (MMW) is produced. The term second reactor refers to the stage where the first high or ultra high molecular weight polyethylene (HMW1) is produced. The term third reactor refers to the stage where the second high or ultra high molecular weight polyethylene (HMW2) is produced.

The low molecular weight polyethylene polymer polymerized in the first reactor has a the weight average molecular weight (Mw) of 20,000-90,000 g/mol.

The medium molecular weight polyethylene polymer polymerized in the first reactor has a number average molecular weight (Mn) of 9,000 to 12,000 g/mol and a weight average molecular weight (Mw) of more than 90,000 to 150,000 g/mol.

The first high or ultra high molecular weight polyethylene polymer polymerized in the second reactor has a weight average molecular weight (Mw) of more than 150,000 to 5,000,000 g/mol.

The second high or ultra high molecular weight polyethylene polymer polymerized in the third reactor has a weight average molecular weight (Mw) of more than 150,000 to 5,000,000 g/mol.

The LMW or MMW is produced in the first reactor in the absence of comonomer in order to obtain a homopolymer.

In this process, ethylene is polymerized in the first reactor in the absence of comonomer in order to obtain high density LMW or MMW polyethylene having density ≥0.965 g/cm³ and $MI_2$ in the range of 10-1000 g/10 min for LMW and 0.1 to 10 g/10 min for MMW. In order to obtain the target density and MI in the first reactor, the polymerization conditions are controlled and adjusted. The temperature in the first reactor ranges from 65-90° C., preferably 68-85° C. Hydrogen is fed to the first reactor so as to control the molecular weight of the polyethylene. The molar ratio of hydrogen to ethylene in the vapor phase can be varied depending up on the target MI. However, the preferred molar ratio ranges from 0.5-8.0, more preferably 3.0-6.0. The first reactor is operated at pressure between 250 and 900 kPa, preferably 400-850 kPa. An amount of hydrogen present in the vapor phase of the first reactor is in the range of 20-95% by mole, preferably 50-90% by mol.

Before being fed to the second reactor, the slurry obtained from the first reactor containing LMW or MMW polyethylene preferably in hexane is transferred to a hydrogen removal unit which may have a flash drum connected with depressurization equipment preferably including one or the combination of vacuum pump, compressor, blower and ejector where the pressure in the flash drum is reduced so that volatile, unreacted gas, and hydrogen are removed from the slurry stream. The operating pressure of the hydrogen removal unit typically ranges from 103-145 kPa (abs), preferably 104-130 kPa (abs) in which 98.0 to 99.8% by weight of hydrogen can be removed, preferably 98.0 to 99.5% by weight.

The polymerization conditions of the second reactor are notably different from that of the first reactor. The temperature in the second reactor ranges from 70-90° C., preferably 70-80° C. The molar ratio of hydrogen to ethylene is not controlled in this reactor since hydrogen is not fed into the second reactor. Hydrogen in the second reactor is the hydrogen left over from the first reactor that remains in slurry stream after being flashed at the hydrogen removal unit. Polymerization pressure in the second reactor ranges from 100-3000 kPa, preferably 150-900 kPa, more preferably 150-400 kPa and is controlled by the addition of inert gas such as nitrogen.

Hydrogen removal is the comparison result of the amount of the hydrogen present in the slurry mixture before and after passing through the hydrogen removal unit. The calculation of hydrogen removal is performed according to the measurement of gas composition in the first and the second reactor by gas chromatography.

After the substantial amount of hydrogen is removed to achieve the inventive concentration, slurry from the hydrogen removal unit is transferred to the second reactor to continue the polymerization. In this reactor, ethylene can be polymerized with or without α-olefin comonomer to form HMW1 polyethylene in the presence of the LMW or MMW polyethylene obtained from the first reactor. The α-olefin comomer that is useful for the copolymerization includes $C_{4-12}$, preferably 1-butene and/or 1-hexene, more preferably 1-butene.

After the polymerization in the second reactor, the slurry obtained is transferred to the third reactor to continue the polymerization.

The HMW2 is produced in the third reactor by copolymerizing ethylene with optionally α-olefin comonomer at the presence of LMW and HWM1 obtained from the first and second reactor. The α-olefin comonomer that is useful for the copolymerization include $C_{4-12}$, preferably 1-butene and/or 1-hexene, more preferably 1-butene.

In order to obtain the target density and the target MI in the third reactor, the polymerization conditions are controlled and adjusted. However, the polymerization conditions of the third reactor are notably different from the first and second reactor. The temperature in the third reactor ranges from 68-90° C. preferably 68-80° C. Hydrogen is fed to the third reactor so as to control the molecular weight of polyethylene. The molar ratio of hydrogen to ethylene can be varied depending up on the target MI. However, the preferred molar ratio ranges from 0.01-2.0.

Polymerization pressure in the third reactor ranges from 150-900 kPa, preferably 150-400 kPa, and is controlled by the addition of inert gas such as nitrogen.

The final (free-flow) multimodal polyethylene composition is obtained by separating hexane from the slurry discharged from the third reactor.

The resultant polyethylene powder may then be mixed with antioxidants and optionally additives before being extruded and granulated into pellets.

The pellets was then blown into a film using the conventional tubular blow film process with different thickness and further evaluated for the film properties.

DEFINITION AND MEASUREMENT METHODS $MI_2$: Melt flow index of polyethylene was measured according to ASTM D 1238 and indicated in g/10 min that determines the flowability of polymer under testing condition at 190° C. with load 2.16 kg.

Density: Density of polyethylene was measured by observing the level to which a pellet sinks in a liquid column gradient tube, in comparison with standards of known density. This method is determination of the solid plastic after annealing at 120° C. follow ASTM D 1505.

Molecular weight and Polydispersity index (PDI): The weight average molecular weight (Mw), the number average molecular weight (Mn) and the Z average molecular weight (Mz) in g/mol were analysed by gel permeation chromatography (GPC). Polydispersity index was calculated by Mw/Mn.

Around 8 mg of sample was dissolved in 8 ml of 1,2,4-trichlorobenzene at 160° C. for 90 min. Then the sample solution, 200 μl, was injected into the high temperature GPC with IRS, an infared detector (Polymer Char, Spain) with flow rate of 0.5 ml/min at 145° C. in column zone and 160° C. in detector zone. The data was processed by GPC One® software, Polymer Char, Spain.

Film bubble stability: It was determined during the blown film process, the axial oscillation of the film bubble was observed during increasing the nip roll take up speed and continue more than 30 minute. Good bubble stability is defined when film is not oscillating and bubble is not break.

Output: The film was blown following the blown film conditions. Then the film was collected for a minute and weight. The output of film from unit of g/min is then calculated and reported in the unit of kg/hr.

Dart drop impact: This test method follow method A of ASTM D1709 that covers the determination of the energy that cause plastic film to fail under specified conditions of free-falling dart impact. This energy is expressed in terms of the weight of the falling from a specified height, 0.66±0.01 m, which result in 50% failure of specimens tested.

Puncture resistance: This testing is in-housed method that a specimen is clamped without tension between circular plates of a ring clamp attachment in UTM. A force is exerted against the center of the unsupported portion of the test specimen by a solid steel rod attached to the load indicator until rupture of specimen occurs. The maximum force recorded is the value of puncture resistance Tensile strength of film: The test methods cover the determination of tensile properties of film (less than 1.0 mm. in thickness) followed ASTM D882. The testing employs a constant rate of grip separation, 500 mm/min.

Tear strength: This test method covers the determination of the average force to propagate tearing through a specified length of plastic film using an Elmendorf-type tearing tester followed ASTM D 1922

Melt strength and Draw down ratio (DD): They are determined using GOEFFERT Rheotens. The melt extrudate is performed by single screw extruder with 2 mm die diameter at melt temperature 190° C., the extrudate pass through Rheotens haul-off with controlled the ramp speed. The haul-off force is record. The force(N) is collect as a function of draw ratio(DD). Melt strength and draw down ratio is define as the force at break and draw down ratio at break respectively.

Examples

To prepare an inventive film from the above compositions, it was found that a sub-range of multimodal polyethylene compositions which might be obtained using the inventive reactor system are particularly preferred. In detail, the compositions suitable to form the inventive film are as follows and have the following properties. The following comparative examples refer to the film related compositions.

The inventive example E1 was produced follow the disclosed process to make the multimodal polyethylene composition as shown in table 1. The specific multimodal polyethylene compositions enhance superior properties of film in particular the ability to make thin film. The thin film is represented the low thickness of the film such as 5 micron. It could be also refer to the ability to down-gauge the film thickness with equivalent properties to conventional film thickness.

The inventive example E2 is the multimodal polyethylene composition produced by the disclosed process and having polymer as shown in table 3 in the range of claims with $MI_2$ of 0.114 g/10 min and density of 0.9570 g/cm3. It shows good processing in film production and higher output rate with maintaining properties in particular dart drop impact and puncture resistance at 12 micron film thickness.

The comparative example 1 (CE1) is the commercial resin EL-Lene™ H5604F with $MI_2$ of 0.03 g/10 min and density of 0.9567 g/cm$^3$. It is the bimodal polyethylene produced in slurry cascade process.

The comparative example 2 (CE2) is the blend of CE1 with commercial resin LLDPE, Dow™ Butene 1211, with $MI_2$ of 1.0 g/10 min and density of 0.9180 g/cm$^3$. It is the practical way in film production to get better film strength in particular dart drop impact and tear strength.

The comparative example 3 (CE3) is the multimodal polyethylene composition produced by the disclosed process and having the composition and molecular weight distribution out of the specific range of composition for thin film.

From the molding composition so prepared, a film was produced in the following way. The films having different thickness and output were prepared on the internal blown film machine comprising a single screw extruder connecting with tubular blow film apparatus. The temperature setting from extruder to the die is from 175 to 205° C. The screw speed and nip roll take up speed to prepare different film thickness in each experiment is defined in table 2. The film was produced at a blow-up ratio of 4:1 and a neck height of 30 cm with bubble diameter of 23 cm and film lay flat of 39 cm.

TABLE 1

Process condition of inventive example 1, E1, inventive example 2, E2 and comparative example 3, CE3

| Condition | Unit | CE3 | E1 | E2 |
|---|---|---|---|---|
| 1st Reactor | | | | |
| Split ratio | % | 49-50 | 45-47 | 45-47 |
| Temperature | (° C.) | 81-85 | 81-85 | 81-85 |
| Pressure | kPa | 700-750 | 650-700 | 580-620 |
| Hydrogen flow rate | NL/h | 246 | 226 | 248 |
| 2nd Reactor | | | | |
| Split ratio | % | 6-8 | 10-12 | 10-12 |
| Temperature | (° C.) | 70-75 | 70-75 | 70-75 |
| Pressure | kPa | 150-300 | 150-300 | 150-300 |
| Hydrogen flow rate | NL/h | 0 | 0 | 0 |
| Co-monomer | kg/h | 0.031 | 0.010 | 0.0135 |
| Comonomer/Ethylene Feed | — | 0.018 | 0.0033 | 0.0046 |
| H2 removal | | 99.0 | 98.9 | 99.4 |
| Comonomer type | — | 1-Butene | 1-Butene | 1-Butene |
| 3rd Reactor | | | | |
| Split ratio | % | 42-43 | 42-43 | 42-43 |
| Temperature | (° C.) | 70-75 | 70-75 | 70-75 |
| Pressure | kPa | 150-300 | 150-300 | 150-300 |
| Hydrogen flow rate | NL/h | 12.85 | 13.02 | 17.28 |
| Co-monomer | kg/h | 0.052 | 0.0152 | 0.0099 |
| Comonomer/Ethylene Feed | — | 0.0048 | 0.0013 | 0.0009 |
| Comonomer type | — | 1-Butene | 1-Butene | 1-Butene |

TABLE 2

Experiment and conditions for film preparation

| Blown film parameter | Experiment 1 (Ex. 1) | Experiment 2 (Ex. 2) | Experiment 3 (Ex. 3) |
|---|---|---|---|
| Film thickness | 12 | 5 | 5 |
| Screw speed (rpm) | 85 | 85 | 60 |
| Nip roll take up speed (rpm) | 80 | 150 | 95 |
| BUR | 4:1 | 4:1 | 4:1 |
| Neck height (cm) | 30 | 30 | 30 |

The films were further evaluated for processability and mechanical properties in both machine direction, MD and transverse direction, TD as shown in table 3.

TABLE 3

Properties of polyethylene compositions and film thereof

| Properties | CE1 | CE2 | CE3 | E1 | E2 |
|---|---|---|---|---|---|
| Resin | | | | | |
| $MI_2$, g/10 min | 0.03 | 0.065 | 0.08 | 0.08 | 0.114 |
| $MI_2$ of LMW | NA | NA | 624 | 715 | 722 |
| Density, g/cm$^3$ | 0.9567 | 0.9521 | 0.9548 | 0.9566 | 0.9570 |
| Density of HMW1, g/cm$^3$ | NA | NA | 0.9212 | 0.9237 | 0.9213 |
| Density of HMW2, g/cm$^3$ | NA | NA | 0.9464 | 0.9465 | 0.9472 |
| Mn (g/mol) | 7,788 | 8,298 | 9,579 | 9,027 | 8856 |
| Mw (g/mol) | 240,764 | 276,362 | 284,257 | 232,875 | 228400 |
| Mz (g/mol) | 1,817,918 | 1,956,827 | 1,666,188 | 1,403,576 | 1346144 |
| PDI | 30.9 | 33.3 | 29.7 | 25.8 | 25.7 |
| Melt strength at break, N | 0.28 | 0.25 | 0.22 | 0.26 | NA |
| Draw down ratio at break | 10.5 | 12.2 | 12.8 | 12.5 | NA |

TABLE 3-continued

Properties of polyethylene compositions and film thereof

| Film | | | | | | | | |
|---|---|---|---|---|---|---|---|---|
| | Ex. 1 | Ex. 2 | Ex. 3 | Ex 1 | Ex 1 | Ex. 1 | Ex. 2 | Ex 1 |
| Output, kg/hr | 16.0 | NA | 12.8 | 19.1 | 18.8 | 19.7 | 19.9 | 20.3 |
| Film thickness, micron | 12 | 5 | 5 | 12 | 12 | 12 | 5 | 12 |
| Screw speed, rpm | 85 | 85 | 60 | 85 | 85 | 85 | 85 | 85 |
| Nip roll take up speed, rpm | 80 | 150 | 95 | 80 | 80 | 80 | 150 | 80 |
| Blow up ratio, BUR | 4:1 | 4:1 | 4:1 | 4:1 | 4:1 | 4:1 | 4:1 | 4:1 |
| Bubble Stability | Good | Bubble Break | Good | Good | Good | Good | Good | Good |
| Dart drop impact, g | 105 | — | 113 | 140 | 130 | 159 | 108 | 124 |
| Tensile Strength at Break (MD), kg/cm² | 722 | — | 889 | 428 | 826 | 895 | 1068 | 537 |
| Tensile Stregnth at Break (TD), kg/cm² | 501 | — | 574 | 320 | 484 | 745 | 499 | 537 |
| Elongation at Break (MD), % | 266 | — | 52 | 161 | 226 | 417 | 192 | 226 |
| Elongation at Break (TD), % | 510 | — | 388 | 390 | 554 | 605 | 365 | 488 |
| Tear Strength (MD), g | 4.14 | — | 8.4 | 7.8 | 4.74 | 6.6 | 2.3 | 5.5 |
| Tear Strength (TD), g | 50 | — | 14 | 49 | 47 | 60 | 27 | 26 |
| Puncture Energy, N-cm/u | 26 | — | 39 | 21 | 31 | 31 | 46 | 29 |

The inventive example 1 and 2, E1 shows superior properties of 12 micron film prepared by the same conditions compared to comparative examples, CE1, CE2 and CE3. E2 shows maintain film property and higher output with good bubble stability. In particular dart drop impact strength, tensile strength of film in both directions and puncture resistance. Also the film is produced with higher output.

Further experiment to make a thin film at 5 micron was performed in Experiment 2. The Inventive example E1 show better draw ability at higher output which can be easily drawn into 5 micron film with good bubble stability and good mechanical strength. The same experiment was applied to the comparative example CE1 however bubble break was suddenly found. It was possible to make the 5 micron film with CE1 only in the case of lowering output by reducing screw speed and nip roll take up speed as done in Experiment 3. This is also related to draw down at break measured by rheoten. The inventive example 1 E1 has higher draw down at break compared to comparative example CE1.

Moreover the properties of the 5 micron film made by inventive example E1 in Experiment 2 are also equivalent to 12 micron film made by CE1 with Experiment 1 in particular dart drop impact strength, tensile strength at break and puncture resistance. This also indicated the ability to down-gauge the film thickness without sacrifice of mechanical properties. It was also possible to obtain good mechanical properties without use of LLDPE as compared to comparative example CE2.

These results support that the inventive multimodal polyethylene composition provide better balance of mechanical strength with high output for thin film preparation.

The features disclosed in the foregoing description and in the claims may, both separately and in any combination, be material for realizing the invention in diverse forms thereof.

The invention claimed is:

1. A multimodal polyethylene composition comprising;
   (A) 40 to 65 parts by weight, of a low molecular weight polyethylene, the low molecular weight polyethylene having a weight average molecular weight (Mw) of 20,000 to 90,000 g/mol and having a $MI_2$ from 500 to 1,000 g/10 min according to ASTM D 1238;
   (B) 8 to 20 parts by weight of a first high molecular weight polyethylene having a weight average molecular weight (Mw) of more than 150,000 to 1,000,000 g/mol or a first ultra high molecular weight polyethylene having a weight average molecular weight (Mw) of more than 1,000,000 to 5,000,000 g/mol; and
   (C) 30 to 50 parts by weight of a second high molecular weight polyethylene having a weight average molecular weight (Mw) of more than 150,000 to 1,000,000 g/mol or a second ultra high molecular weight polyethylene having a weight average molecular weight (Mw) of more than 1,000,000 to 5,000,000 g/mol, wherein
   the density of the first high molecular weight polyethylene or the first ultra high molecular weight polyethylene and the second high molecular weight polyethylene or the second ultra high molecular weight polyethylene is in the range from 0.920 to 0.950 g/cm³, and
   wherein the polydispersity index (PDI) of the multimodal polyethylene composition is from 20 to 28, measured by gel permeation chromatography.

2. The multimodal polyethylene composition according to claim 1, wherein the $MI_2$ is from 600 to 800 g/10 min.

3. The multimodal polyethylene composition according to claim 1, wherein the polydispersity index (PDI) is from 23 to 28.

4. The multimodal polyethylene composition according to claim 1, wherein the multimodal polyethylene composition has a weight average molecular weight from 150,000 to 400,000 g/mol, measured by Gel Permeation Chromatography.

5. The multimodal polyethylene composition according to claim 1, wherein the multimodal polyethylene composition has a number average molecular weight from 5,000 to 15,000 g/mol, measured by Gel Permeation Chromatography.

6. The multimodal polyethylene composition according to claim 1, wherein the multimodal polyethylene composition has a Z average molecular weight from 1,000,000 to 3,000,000 g/mol, measured by Gel Permeation Chromatography.

7. The multimodal polyethylene composition according to claim 1 wherein the multimodal polyethylene composition has a density from 0.950 to 0.962 g/cm$^3$, according to ASTM D 1505 and/or $MI_2$ from 0.03 to 0.15 g/10 min.

8. Film comprising the multimodal polyethylene composition according to claim 1, wherein the film has a thickness from 4 to 40 μm.

9. The multimodal polyethylene composition of claim 1, comprising 43 to 52 parts by weight of the low molecular weight polyethylene.

10. The multimodal polyethylene composition of claim 9, comprising 44 to 50 parts by weight of the low molecular weight polyethylene.

11. The multimodal polyethylene composition of claim 1, comprising 10 to 18 parts by weight of the first high molecular weight polyethylene.

12. The multimodal polyethylene composition of claim 11, comprising 10 to 15 parts by weight of the first high molecular weight polyethylene.

13. The multimodal polyethylene composition of claim 1, comprising 37 to 47 parts by weight of the second high molecular weight polyethylene.

14. The multimodal polyethylene composition of claim 13, comprising 39 to 45 parts by weight of the second high molecular weight polyethylene.

15. The multimodal polyethylene composition of claim 4, wherein the weight average molecular weight is from 200,000 to 350,000 g/mol, measured by Gel Permeation Chromatography.

16. The multimodal polyethylene composition of claim 5, wherein the number average molecular weight is from 7,000 to 12,000 g/mol, measured by Gel Permeation Chromatography.

17. The multimodal polyethylene composition of claim 6, wherein the Z average molecular weight is from 1,000,000 to 2,500,000 g/mol, measured by Gel Permeation Chromatography.

18. The multimodal polyethylene composition of claim 7, wherein the density is 0.953 to 0.959 g/cm$^3$ according to ASTM D 1505 and/or $MI_2$ is from 0.03 to 0.12 g/10 min, according to ASTM D 1238.

19. The film of claim 8, wherein the thickness is from 4 to 30 μm.

20. The film of claim 19, wherein the thickness is from 4 to 20 μm.

* * * * *